2,945,044

CERTAIN 1-(DIETHYL-AMINOETHYL), 5-AMINO, 2-BENZYL OR SUBSTITUTED BENZYL, BENZIMIDAZOLES

Karl Hoffmann, Binningen, and Alfred Hunger, Jindrich Kebrle, and Alberto Rossi, Basel, Switzerland, assignors to Ciba Pharmaceutical Products, Inc., Summit, N.J.

No Drawing. Filed June 19, 1958, Ser. No. 743,006

Claims priority, application Switzerland July 12, 1957

5 Claims. (Cl. 260—309.2)

This invention provides as new compounds 1-(lower tertiary amino-lower alkyl)-benzimidazoles which contain in the 2-position a benzyl radical and in the 5-position an amino group, and salts of these compounds. The invention provides more especially benzimidazoles of the formula

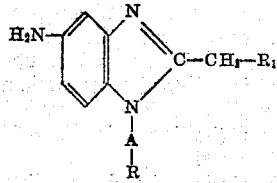

in which A represents a lower alkylene radical, especially an ethylene group, and R represents a lower alkyleneimino group which may be interrupted by a hetero atom, such as a piperidino, pyrrolidino or morpholino group, and especially a di-lower alkylamino group, and above all the diethylamino group, and $R_1$ represents a phenyl radical which is unsubstituted or substituted in the 3- and/or 4-position, and especially in the 4-position by a halogen atom or a lower alkyl or lower alkoxy group, and salts of these compounds.

The new compounds are active as analgesics, muscle relaxants, and are useful as medicaments in these respects. Of special interest on account of their therapeutic properties are compounds of the formula

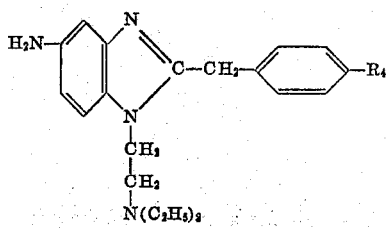

in which $R_4$ represents a hydrogen atom, chlorine atom, or lower alkyl or lower alkoxy group, and more especially 1-(β-diethylaminoethyl)-2-(para-chlorobenzyl)-5-amino-benzimidazole, 1 - (β-diethylaminoethyl)-2-(para-methoxybenzyl)-5-amino-benzimidazole, 1-(β-diethylaminoethyl)-2-(β-alkoxybenzyl) - 5 - amino - benzimidazole, and salts of these compounds.

The new benzimidazoles are made by methods in themselves known. One process consists, for example, in introducing a lower tertiary amino-lower alkyl radical directly or in stages into the 1-position of a 5-amino-2-benzimidazole. Thus, a 5-amino-2-benzyl-benzimidazole may be reacted with a reactive ester of an alcohol of the formula

HO—A—R' in which A has the meaning given above, and R' represents a tertiary amino group or a substituent convertible into a tertiary amino group, for example, a hydroxyl group, and, when the resulting compound contains such a substituent, converting the latter into a tertiary amino group, for example, so converting a hydroxyl group by chlorination followed by reaction with a secondary amine. Reactive esters are especially those of strong inorganic or organic acids, such as hydrohalic acids or organic sulfonic acids, such as para-toluene sulfonic acid. The introduction is advantageously carried out in the presence of a condensing agent, especially one which is capable of forming metal salts with 5-amino-2-benzylbenzimidazoles, such as an alkali metal or alkaline earth metal, for example, sodium, lithium or calcium, or an amide, hydride, hydrocarbon compound, alcoholate, oxide or hydroxide of such a metal, for example, sodamide, sodium hydride, lithium-butyl, potassium-phenyl, lithium-phenyl, potassium tertiary butylate, potassium tertiary amylate, sodium ethylate, sodium oxide or sodium hydroxide, or a preformed metal salt of the benzimidazole may be used. In this reaction there is usually obtained a mixture of 5- and 6-amino derivatives which can be split up into its components, for example, by crystallization of the bases or their salts.

In another process for making the new compounds a 2-(R''—NH)-5-aminoaniline or an appropriate N-substituted derivative thereof, in which R'' represents the aforesaid group R—A— or a substituent convertible into such group, for example, a halogen-alkyl group, is subjected to ring closure to form the benzimidazole ring substituted in the 2-position by a benzyl group and in the 5-position by an amino group. The substituent convertible into the group R—A— is subsequently converted into such group, in the case of the halogen-alkyl group, for example, by reaction with a secondary amine. Thus, for example, a 2-(tertiary aminoalkylamino)-5-aminoaniline may be subjected to ring closure with a phenyl-acetic acid or a reactive functional derivative thereof, especially an ester thereof with an alcohol easily capable of being split off or an imino-ether, the ring closure being carried out directly or in stages. For making the products of the invention it is also possible to use for the condensation, instead of a phenyl-acetic acid, a phenyl-acetaldehyde or a functional derivative thereof, and to oxidize the product so obtained. In the above reactions the starting materials may also be formed under the reaction conditions.

A further process consists in forming an amino group in the 5-position of a 1-(lower tertiary amino-loweralkyl)- 2-benzyl-benzimidazole, for example, by the conversion of a substituent in the 5-position convertible into an amino group, for example, by the hydrolysis of an acylated amino group or by the reduction of a nitro group.

The reactions are carried out in the presence or absence of a diluent and/or a condensing agent, when necessary at a raised temperature in an open or closed vessel under pressure.

In the product so obtained any substituents in the benzyl radical may be exchanged for other groups, for example, a hydroxyl group may be converted into an etherified hydroxyl group, such as a lower alkoxy group, or a nitro group may be converted into an amino group and the latter into a lower alkoxy group or a halogen atom.

Depending on the procedure used the new compounds are obtained in the form of the free bases or salts thereof. From the salts the free bases can be obtained by methods in themselves known. From the free bases salts can be made by reaction with acids suitable for the formation of therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzene sulfonic acid or toluene sulfonic acid or a therapeutically active acid.

The starting materials are known or can be made by methods in themselves known, the nitro-compounds being obtainable, for example, by the process described in U.S. patent application Serial No. 684,860, filed September 19, 1957, by Karl Hoffmann et al.

The invention includes any modification of the process in which there is used as starting material a compound obtainable as an intermediate product at any stage of the process and the remaining process steps are carried out.

The new compounds can be used as medicaments, for example, in the form of pharmaceutical preparations which contain the compound or a salt thereof in admixture with a pharmaceutical organic or inorganic, solid or liquid carrier suitable for enteral, parenteral or topical administration. For making the carriers there are used substances that do not react with the new compounds for example, water, gelatine, lactose, starches, magnesium stearate, talc, vegetable oils, benzyl alcohols, gums, polyalkylene glycols, white petroleum jelly, cholesterol or other carriers known for medicaments. The pharmaceutical preparations may be made up, for example, in the form of tablets, dragees, salves, creams or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances.

The following examples illustrate the invention:

Example 1

20 grams of 1-(β-diethylaminoethyl)-2-(para-chlorobenzyl)-5-nitro-benzimidazole are agitated under hydrogen in 130 ml. of ethyl acetate with 10 grams of Rupe nickel until 3.47 liters of hydrogen have been adsorbed, and the catalyst is then filtered off and the filtrate is evaporated. The resulting 1-(β-diethylaminoethyl)-2-(para-chlorobenzyl)-5-aminobenzimidazole crystallizes from a mixture of alcohol and water in the form of a colorless hydrate melting at 90–94° C.

Example 2

The product of Example 1 is also obtained when the hydrochloride of 2-(β-diethylamino-ethylamino)-5-nitraniline is hydrogenated with the use of a palladium catalyst and the resulting crude 2-(β-diethylaminoethylamino)-5-amino aniline is reacted with the iminoether of para-chlorophenyl acetic acid obtainable from para-chlorobenzyl cyanide.

Example 3

8.0 grams of 1-(β-diethylaminoethyl)-2-(para-methoxybenzyl)-5-nitro-benzimidazole hydrochloride are agitated in 100 ml. of alcohol and 30 ml. of water in the presence of 0.4 gram of palladium-charcoal of 10% strength under hydrogen until 1.28 liters of hydrogen have been absorbed, and the catalyst is filtered off and the filtrate evaporated. The residue is rendered alkaline with dilute ammonia, extracted with ethyl acetate, dried and evaporated. The resulting 1-(β-diethylaminoethyl)-2-(para-methoxybenzyl)-5-amino-benzimidazole crystallizes from a mixture of ether and petroleum ether after the addition of a small amount of water in the form of a hydrate melting at 86–89° C. The dihydrochloride melting at 245–248° C. can be obtained by dissolving the base in alcohol and adding the calculated quantity of hydrogen chloride in ethyl acetate.

Example 4

17.4 grams of 1-(β-diethylamino-ethyl)-2-(para-ethoxybenzyl)-5-nitro-benzimidazole hydrochloride in 200 cc. of alcohol and 60 cc. of water in the presence of 0.6 gram of palladium charcoal of 10% strength are agitated in an atmosphere of nitrogen until 2.72 liters of hydrogen are absorbed, then filtered to remove the catalyst and evaporated.

The residue is rendered alkaline with dilute ammonia solution and the precipitated oil taken up in ethyl acetate. On evaporation of the solvent under reduced pressure crude 1-(β-diethylamino-ethyl)-2-(para-ethoxybenzyl)-5-aminobenzimidazole is obtained which crystallizes as hydrate from a mixture of ether and petroleum ether on addition of a small amount of water. It melts at 78–82° C.

Example 5

3.9 grams of 2-benzyl-5-amino-benzimidazole, obtained by catalytic reduction from 2-benzyl-5-nitro-benzimidazole, are dissolved in 100 cc. of dioxane. Into this solution is stirred 0.7 gram of sodamide and then 2.4 grams of β-diethylaminoethyl chloride added dropwise in the course of half an hour at 70° C. while stirring. The reaction mixture is refluxed for 12 hours, treated with "Norit," filtered and evaporated under reduced pressure. The residue is covered with 100 cc. of water, rendered alkaline with ammonia, and taken up in ether. The ethereal extract is dried with magnesium sulfate, evaporated, and the oil that remains behind distilled under reduced pressure (boiling point, 200–210° C. under a pressure of 0.1 mm.).

In alcoholic solution, the viscous distillate, which is a mixture of 1-(β-diethylaminoethyl)-2-benzyl-5-amino- and 6-amino-benzimidazole, is converted into the dihydrochloride with alcoholic hydrochloric acid. By the addition of ether, the dihydrochloride of 1-(B-diethylaminoethyl)-2-benzyl-5-amino benzimidazole is precipitated in crystalline form.

The dihydrochloride is a colorless water-soluble salt which melts and decomposes at 280° C.

What is claimed is:

1. A member of the group consisting of benzimidazoles of the formula

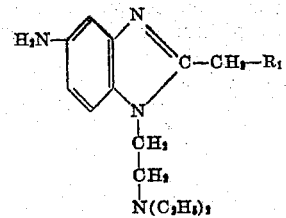

wherein $R_1$ stands for a member of the group consisting of unsubstituted phenyl and phenyl substituted solely in one of the positions 3 and 4 by halogen, lower alkyl and lower alkoxy, and therapeutically acceptable acid addition salts.

2. 1-(β-diethylamino - ethyl) - 2-(para-chloro-benzyl)-5-amino-benzimidazole.

3. 1-(β-diethylamino - ethyl)-2-(para-methoxy-benzyl)-5-amino-benzimidazole.

4. 1-(β-diethylamino - ethyl)-2-(paraethoxy-benzyl)-5-amino-benzimidazole.

5. Therapeutically useful acid addition salts of the compounds of claim 3.

No references cited.

UNITED STATES PATENT OFFICE
CERTIFICATE OF CORRECTION

Patent No. 2,945,044                      July 12, 1960

Karl Hoffmann et al.

It is hereby certified that error appears in the printed specification of the above numbered patent requiring correction and that the said Letters Patent should read as corrected below.

Column 1, line 63, for "5-amino-2-benz-" read -- 5-amino-2-benzyl-benz- --.

Signed and sealed this 4th day of April 1961.

(SEAL)
Attest: ERNEST W. SWIDER

Attesting Officer

ARTHUR W. CROCKER
Acting Commissioner of Patents